(12) United States Patent
Magee

(10) Patent No.: US 10,188,886 B2
(45) Date of Patent: Jan. 29, 2019

(54) VALVE MONITORING

(71) Applicant: AMTRON VALVE MONITORING DEVICE PTY. LTD, Moorabbin, Victoria (AU)

(72) Inventor: Anthony James Magee, Moorabbin (AU)

(73) Assignee: Amtron Valve Monitoring Device Pty. Ltd., Moorabbin, Victoria (AU)

( * ) Notice: Subject to any disclaimer, the term of this patent is extended or adjusted under 35 U.S.C. 154(b) by 0 days.

(21) Appl. No.: 15/511,391

(22) PCT Filed: Sep. 16, 2015

(86) PCT No.: PCT/AU2015/000570
§ 371 (c)(1),
(2) Date: Mar. 15, 2017

(87) PCT Pub. No.: WO2016/040988
PCT Pub. Date: Mar. 24, 2016

(65) Prior Publication Data
US 2017/0232285 A1  Aug. 17, 2017

(30) Foreign Application Priority Data
Sep. 16, 2014  (AU) .............................. 2014903697

(51) Int. Cl.
*A62C 37/50* (2006.01)
*F16K 37/00* (2006.01)
(Continued)

(52) U.S. Cl.
CPC .............. *A62C 37/50* (2013.01); *A62C 35/68* (2013.01); *F16K 1/221* (2013.01); *F16K 31/521* (2013.01);
(Continued)

(58) Field of Classification Search
CPC ..... A62C 35/68; A62C 37/50; F16K 37/0041; Y10T 137/8275; Y10T 137/7986
See application file for complete search history.

(56) References Cited

U.S. PATENT DOCUMENTS 4,831,873 A * 5/1989 Charbonneau ...... F16K 37/0083
73/168
5,305,781 A * 4/1994 Raymond, Jr. ..... F16K 37/0041
137/554

(Continued)

FOREIGN PATENT DOCUMENTS

CN  201810867  4/2011
CN  203718125  7/2014

OTHER PUBLICATIONS

Written Opinion and International Search Report for PCT/AU2015/000570 dated Oct. 14, 2015 (7 pages).

*Primary Examiner* — Craig Schneider
*Assistant Examiner* — Kevin Barss
(74) *Attorney, Agent, or Firm* — Michael Best & Friedrich LLP

(57) ABSTRACT

A valve gear box has a valve monitoring function. The valve gear box is for mounting to a valve that has a fluid passageway and a gate therefor, the gear box providing a gear driven link for moving the gate between open and closed conditions of the fluid passageway, the valve gear box being in a housing that has a mounting for permitting operative connection to the valve via a mounting flange of the valve. The mounting and the mounting flange have a valve monitoring sensor operatively positioned therewith, the sensor being settable in one state when the mounting and the mounting flange are in assembled relationship to each other but being configured to change from the one state if there is a separation of the fastened connection of the mounting and the mounting flange, whereby a change in state from the one
(Continued)

state can be used to monitor a separation of the assembled relationship of the mounting and the mounting flange and trigger an alarm condition.

17 Claims, 14 Drawing Sheets

(51) Int. Cl.
*A62C 35/68* (2006.01)
*F16K 31/52* (2006.01)
*F16K 1/22* (2006.01)

(52) U.S. Cl.
CPC ...... *F16K 37/0008* (2013.01); *F16K 37/0033* (2013.01); *F16K 37/0041* (2013.01); *Y10T 137/7896* (2015.04); *Y10T 137/8275* (2015.04)

(56) References Cited

U.S. PATENT DOCUMENTS

| 5,487,302 | A | * | 1/1996 | Casada | F16K 31/046 73/168 |
| 8,517,337 | B2 | * | 8/2013 | Kuehl | F25D 29/00 141/349 |
| 2004/0149831 | A1 | * | 8/2004 | Sheeran | G05D 23/1393 236/12.1 |

* cited by examiner

VALVE MONITORING

FIELD OF THE INVENTION

This invention relates to a valve gear box, and to a valve with such a gear box that has a valve monitoring function. The invention has particular although not exclusive application to valve monitoring in a fire sprinkler installation.

BACKGROUND TO THE INVENTION

Valve monitoring for sensing the open or closed or both conditions of valves in a fire sprinkler installation has been known, for example, in U.S. Pat. Nos. 4,696,325, 4,967,792 and 5,031,660. Building regulations have been proposed to provide for monitoring of valves in a fire sprinkler installation so as to permit an alarm condition to be triggered if there is an attempt to turn off control valves that allow water to pass to sprinkler heads. The abovementioned prior patents relate to different aspects of valve monitoring and generally relate to valve monitoring to avoid attempts to override any alarm switches that may otherwise activate if a person were maliciously attempting to close the valves to prevent normal operation of the sprinkler system in the event of a fire.

Typically, such valves come with a gear box which can be operated manually to move a gate of the valve from a closed condition to an open condition and vice versa. Some gear boxes incorporate valve monitoring functions within these gear boxes to sense the open or closed condition of the valve, however, we have determined that there are deficiencies in existing valve monitoring techniques which allow the valve monitoring functions to be bypassed either for nefarious reasons or by tradespeople taking shortcuts during maintenance. In this respect, it is critical particularly for sprinkler systems be fully operational as even a partial closure of the valve can result in insufficient fluid flow to allow the sprinklers to operate effectively if there is a fire.

SUMMARY OF THE INVENTION

In a first broad aspect the invention provides a valve gear box having a valve monitoring function, said valve gear box being for mounting to a valve that has a fluid passageway and a gate therefor, said gear box providing a gear driven link for moving said gate between open and closed conditions of said fluid passageway, said valve gear box being in a housing that has a mounting for permitting operative connection to the valve via a mounting flange of said valve,
  said mounting and said mounting flange having a valve monitoring sensor operatively positioned therewith, said sensor being settable in one state when said mounting and said mounting flange are in assembled relationship to each other but being configured to change from said one state if there is a separation of the fastened connection of the mounting and said mounting flange, whereby a change in state from said one state can be used to monitor a separation of the assembled relationship of said mounting and said mounting flange and trigger an alarm condition.

In an embodiment, the gear driven link has a gate position sensor associated therewith so that said gate position sensor can be in one state when the gate is in an opened condition, and which can change from said one state when said gate is moved towards a closed condition,
  whereby a change of state from said one state can be used to monitor a closing of said gate and trigger an alarm condition.

In an embodiment, part of said gate position sensor is mounted to an arm that is directly drive connected with a spindle of said gate.

In an embodiment, the gear driven link includes a shear separator that will shear in the event of excess force being applied to the operator handle, and wherein said gate position sensor will still be correctly operationally functional to monitor a closing of said gate even if said shear separator has been separated.

In an embodiment, the operator handle drives a worm gear which, in turn, drives a travelling nut that can advance or retreat along the worm gear corresponding to a direction of rotation of said operator handle, and wherein said travelling nut has a shear separator connection with said arm.

In an embodiment, the gear driven link is provided in a gear compartment of a housing associated with said mounting, and wherein said valve monitoring sensor comprises an electrical switch which can change state if there is separation of said mounting and said mounting flange, and wherein the electrical components of said valve monitoring sensor are in an electrical compartment of said housing separate to said gear compartment.

In an embodiment, said gear driven link has a gate position sensor associated therewith so that said gate position sensor can be in one state when the gate is in an opened condition, and which can change from said one state when said gate is moved towards a closed condition, whereby a change of state from said one state can be used to monitor a closing of said gate and trigger an alarm condition and wherein electrical components of said gate position sensor are in said electrical compartment.

In an embodiment, the electrical compartment is closed by a removable lid and wherein a lid sensor is associated therewith, and wherein said lid sensor can be in one state when said lid is closed and which can change from said one state when said lid is opened, whereby a change of state can be used to trigger an alarm condition.

In an embodiment, the lid sensor comprises an electrical switch which can change state during an opening of said lid, and wherein electrical components of said lid sensor are in said electrical compartment.

In an embodiment, the gear compartment and said electrical compartment are fluid isolated from each other whereby if fluid should leak into said gear compartment from said fluid passageway, said electrical compartment will be fluid isolated from the fluid then in said gear compartment.

In an embodiment, the external electrical termination with said valve monitoring sensor is via terminals within said electrical compartment and without said valve having an external electrical junction box, whereby to inhibit tampering with the electrical terminations without removal of said lid.

In an embodiment, the mounting is of a non-ferrous material.

In an embodiment, the valve monitoring sensor, said gate position sensor and said lid sensor, are reed switches that co-operate with respective permanent magnets, there being a valve monitoring sensor permanent magnet carried by said mounting flange, a gate position sensor permanent magnet carried by said arm, and a lid position sensor permanent magnet carried by said lid.

In an embodiment, the valve monitoring sensor, said gate position sensor and said lid sensor are reed switches that co-operate with respective permanent magnets, there being a valve monitoring sensor permanent magnet carried in a bolt used for bolting said mounting to said mounting flange, a gate position sensor permanent magnet carried by said arm, and a lid position sensor permanent magnet carried by said lid.

In an embodiment, the valve monitoring sensor, said gate position sensor, and said lid sensor are mounted on a circuit board that is, in turn, mounted in said electrical compartment so there will be correct alignment of the sensors for operation with their respective permanent magnets.

In an embodiment, the valve gear box includes at least one magnetically operable protection sensor that will change state, if an external magnetic field is applied to the gear box in an attempt to cause the valve monitoring sensor to retain its current state by a person maliciously wishing to then subsequently remove the gear box connection with the valve.

In an embodiment, the valve gear box is fitted to a valve.

BRIEF DESCRIPTION OF THE DRAWING

In order that the invention may be more clearly ascertained, embodiments will now be described with, reference to the accompanying drawings, in which.

DETAILED DESCRIPTION OF EMBODIMENTS OF THE INVENTION

It should be appreciated that the invention is applicable to valve monitoring in any environment where fluid is flowing in a fluid passageway and that the invention is not limited to use only in connection with fire alarm sprinkler installations.

Figure 1:
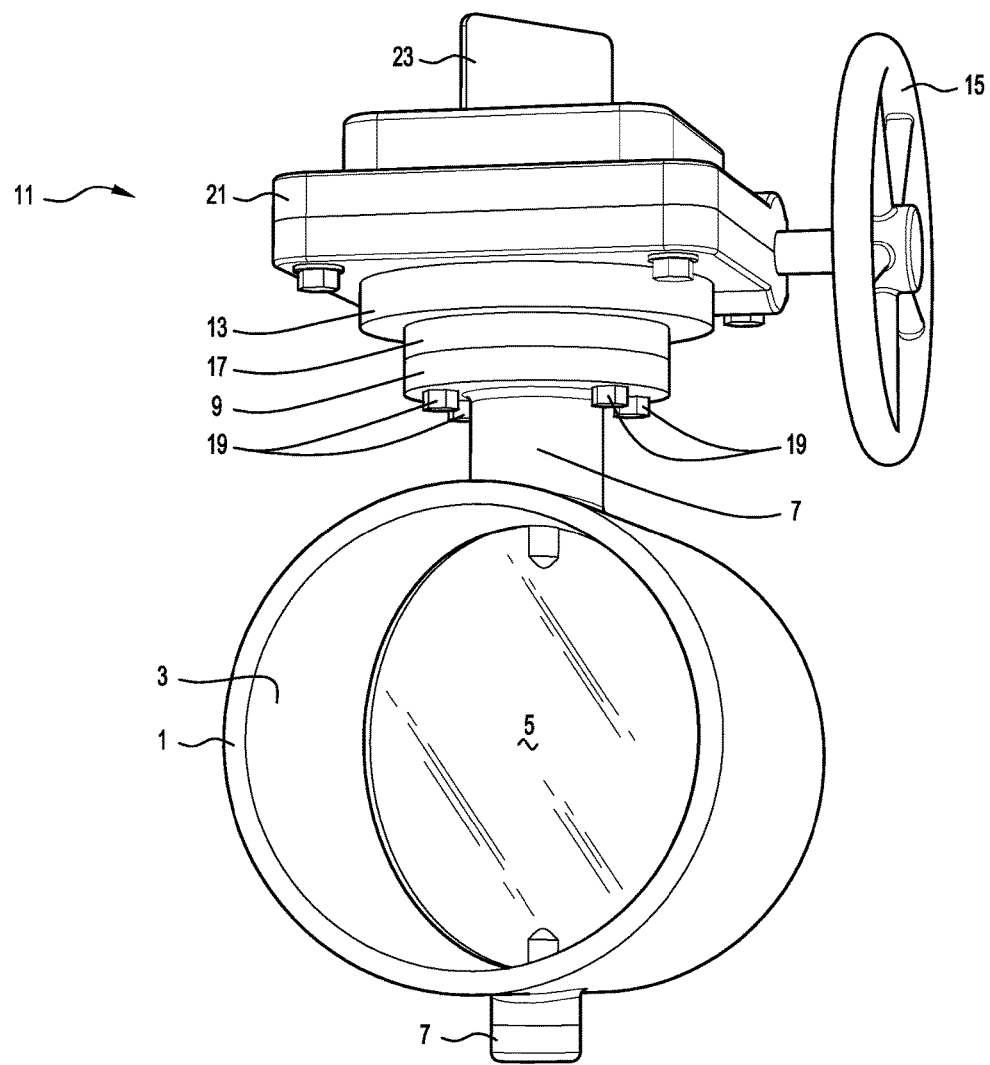
FIG. 1 is a perspective view of one known prior art valve and valve gear box that has a valve monitoring function.
Figure 2:
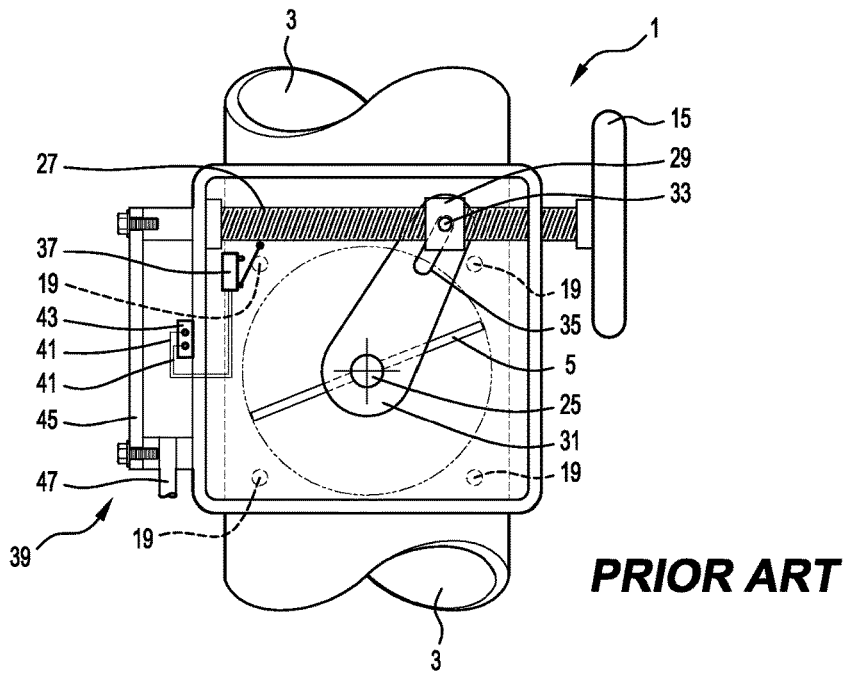
FIG. 2 is a view of the prior art valve of FIG. 1 with a lid of the gear box removed, and showing the gate of the valve in a partly closed condition.
Figure 3:
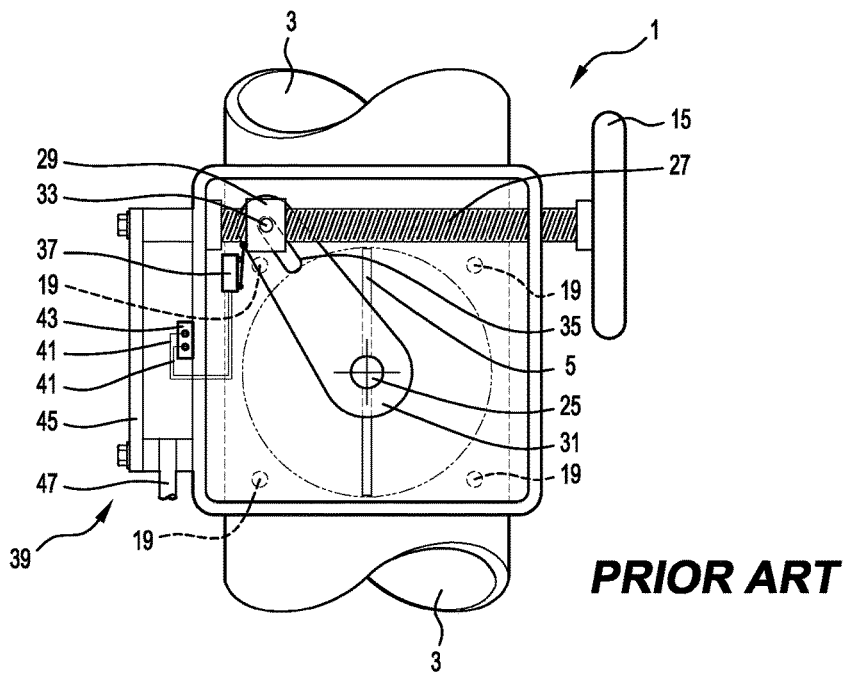
FIG. 3 is a view similar to that in FIG. 2 but showing the gate of the valve in a fully open condition.

FIGS. 1 to 3 illustrate a prior art valve and valve gear box. It can be seen that a valve 1 has a fluid passageway 3, and gate 5 therein. The gate 5 is a butterfly gate that can move about a central upright axis from a closed position to an open position at 90 degree. The gate 5 has upper and lower bearing parts 7. The upper part 7 terminates with a valve mounting flange 9. A manually operated gear box 11 for swinging the gate 5 is provided in a housing 13. The gear box 11 contains a gear driven link for moving the gate 5 between open and closed conditions relative to the fluid passageway 3 in response to operation of a user operated handle 15. The gear driven link causes the gate 5 to swing about the central upright axis. The gear box 11 has a mounting 17 to enable the gear box 11 to be mounted to the valve mounting flange 9 by four bolts 19. The bolts 19 are positioned relative to the mounting flange 9 according to an ISO standard and thus a gear box 11 from one valve 1 can be interchanged with a gear box 11 from other valves 1 if required. The gear box 11 contains a lid 21 that can be bolted to cover the gear driven link within the gear box 11. An axle of the gate 5 passes through the lid 21 and an elongate flat visual indicator 23 can be attached relative to the axle so that it extends parallel with the plane of the gate 5. This allows a visual inspection of the valve 1 and an immediate determination of the position of the gate 5—either being open and/or closed. FIGS. 2 and 3 show the axle 25 of the gate 5, and also show that the handle 15 is connected to a worm gear 27, which forms part of the gear driven link. A travelling nut 29 is screw threadably received relative to the worm gear 27 and can advance or retreat along the worm gear 27 depending on the direction of rotation of the handle 15. The gear driven link, also includes an arm 31 that is directly connected with the axle 25. As the nut 29 advances or retreats along the worm gear 27, the arm 31 is moved which, in turn, results in an opening or closing of the gate 5 relative to the fluid passageway 3. A shear pin 33 extends from the nut 29 and into an elongate slot 35 in the arm 31. The slot 35 allows the shear pin 33 to engage with the arm 31 and to permit the swinging of the gate 5. If the gate 5 should become jammed, then the shear pin 33 will shear to inhibit further operation of the gate 5. This is typically provided so that if there is fluid flowing in the fluid passageway 3, because of a sprinkler system operating to expel water, that a force needed to then swing the gate 5 closed will result in shearing of the shear pin 33 and prevent closing of the valve 1. This provides a safety feature.

FIGS. 2 and 3 show a gate position sensor 37 in the form a micro switch positioned to engage with the nut 29 when the valve gate 5 is fully open. It can be seen in FIG. 3 that the nut 29 is pressing on the operating arm of the micro switch and mechanically closes the micro switch to permit sensing that the gate 5 is fully opened. If the nut 29 is moved away from the fully opened position to the position shown in FIG. 2, then it can be seen that the nut 29 no longer engages with the arm of the micro switch and the micro switch is caused to be switched open which can be used to trigger an alarm condition.

Under normal in use conditions where the valve is open, the nut 29 will be in the position shown in FIG. 3 where the micro switch is closed.

A problem with such sensor 37 is that the valve 1 may be in that condition for many years without operation of the gear driven link to move the nut 29 away from the gate position sensor 37. In such case, a spring mechanism within the micro switch of the gate position sensor 37 can be weakened to the point where if the nut 29 is then moved away from the gate position sensor 37 then the micro switch does not switch.

A further problem is that if the shear pin 33 should shear, then the arm 31 is then free from the nut 29 and can move such that the gate 5 is not in the position indicated by gate position sensor. For example, after the shear pin 33 shears, nut 29 may remain at the position shown in FIG. 3 where the gate position sensor 37 closed however, as the arm 31 is free from the nut 29, the gate 5 may be in a position other than the fully open condition, even though the gate position sensor 37 is sensing that it is fully opened.

A further problem with the arrangement shown in FIGS. 1 through 3 is that water from the fluid passageway 3 can pass upwardly through bearings that support that the axle 25 and into the gear box housing 13. This, in turn, floods the housing and subjects the gate position sensor 37 to water ingress which, in turn, can affect operation of the gate position sensor 37.

A further problem with the prior art valve and gear box arrangement shown in FIGS. 1 through 3 is that an electrical termination box 39 is fitted to the housing 13. Electrical leads 41 from the gate position sensor 37 pass into the termination box 39 to terminal block 43. Specifically, electrical leads 41 pass through conduit 47 in a side of the termination box 39. The termination box 39 has a lid 45 that permits access to the terminal block 43. In the known valves 1, the lid 45 can be removed and the electrical leads 41 shorted through the terminal block 43 by a person maliciously wishing to close the gate 5 without triggering an alarm condition. Such shorting causes any associated control alarm circuits to be fooled into a condition that the sensor 37 is switched closed even if it is not. Thus, the termination box 39 provides a readily accessible weak link.

FIGS. 4 through 8 illustrate an example of an embodiment of the present invention. A valve gear box 51 is provided for fitting to a valve such as the valve shown in FIGS. 1 through 3. For example, the prior art valve can be purchased with gear box 11 fitted and the gear box 11 can be removed and the gear box 51 substituted for the removed gear box 11. This is because the bolts 19 are positioned according to an ISO standard, and the gear box 51 can be made to receive the bolts 19 in appropriately aligned bolt receiving apertures in the gear box 51. In some embodiments, the gear box 51 is made from an industrial grade plastics material, or non ferrous metals or other materials, other than ferrous materials. The gear box 51 has a mounting 53 provided in a bottom-most surface part 52 of the gear box housing. Thus, the mounting 53 can be directly engaged with the mounting flange 9 and the bolts 19 inserted and tightened to hold the gear box 51 relative to the valve 1.

Figure 4:
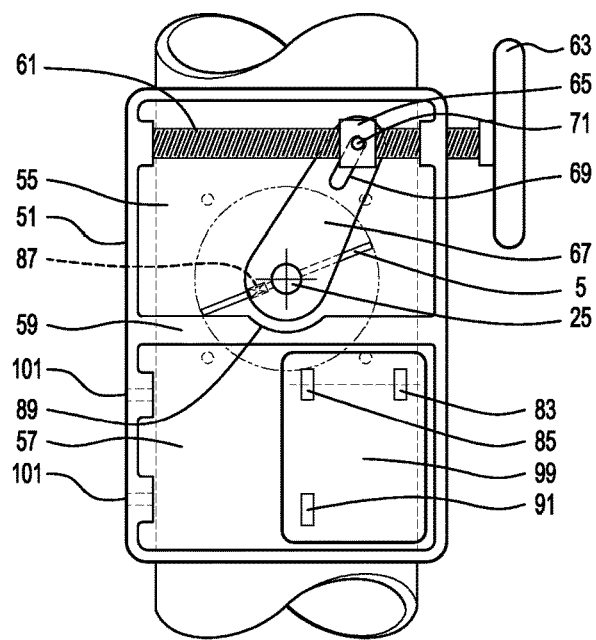
FIG. 4 is a view similar to that in FIG. 2 showing an example of an embodiment of the present invention and with the gate of the valve being partly closed.
Figure 5:
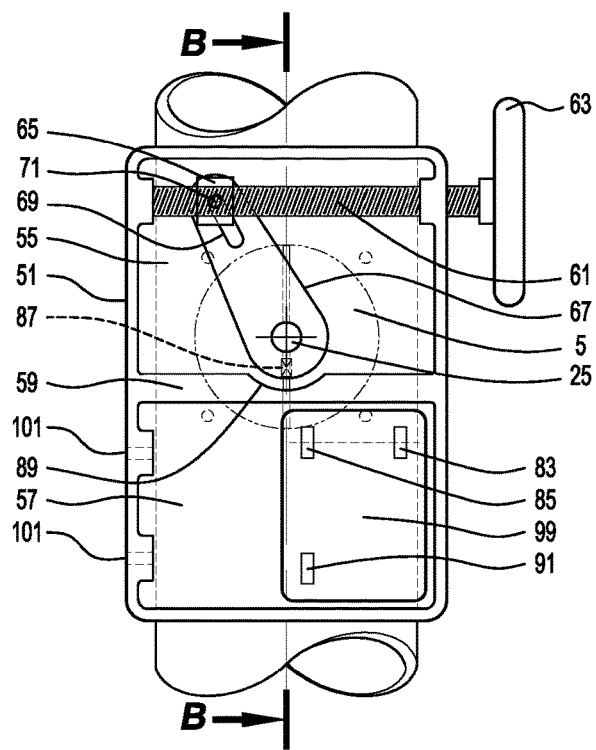
FIG. 5 is a view similar to that in FIG. 4 showing the example of the embodiment with the gate fully opened.

FIGS. 4 and 5 show that the housing of the gear box 51 has a gear compartment 55 and an electrical compartment 57, and that these compartments are fluid isolated from each other by an intermediate wall 59 that forms part of the housing of the gear box 51. Thus, the wall 59 provides fluid isolation between the gear compartment 55 and the electrical compartment 57. A worm gear 61 (similar to worm gear 27) is provided in the gear compartment 55 and suitably mounted therein for longitudinal axial rotation. A handle 63 is fitted to the end of the worm gear 61 to permit manual operation of the gear driven links within the gear compartment 55. A travelling nut 65 is screwed threadably retained on the worm gear 61 and can advance and retreat thereon depending on the direction of rotation of the handle 63. The nut 65 causes an arm 67 to swing as the nut 65 advances or retreats along the worm gear 61. The arm 67 is, in turn, rigidly attached to the axle 25 of the valve 1 to permit the gate 5 thereof to swing between open and closed positions. An elongate slot 69 is provided in the free end of the arm 67 and a shear pin 71 interconnects nut 65 with the arm 67 and allows for the swinging of the arm 67 as the nut 65 advances or retreats. The shear pin 71 can operate in a similar manner to that described in relation to the prior art example of FIGS. 1 through 3 if excessive force is applied through the operator handle 63. The arm 67 can be attached to the axle 25 by means of suitable grub screws/keys or the like, or by there being flats on the axle 25 that engage with corresponding flats in an aperture in the arm 67 through which the axle 25 can pass.

Figure 6:
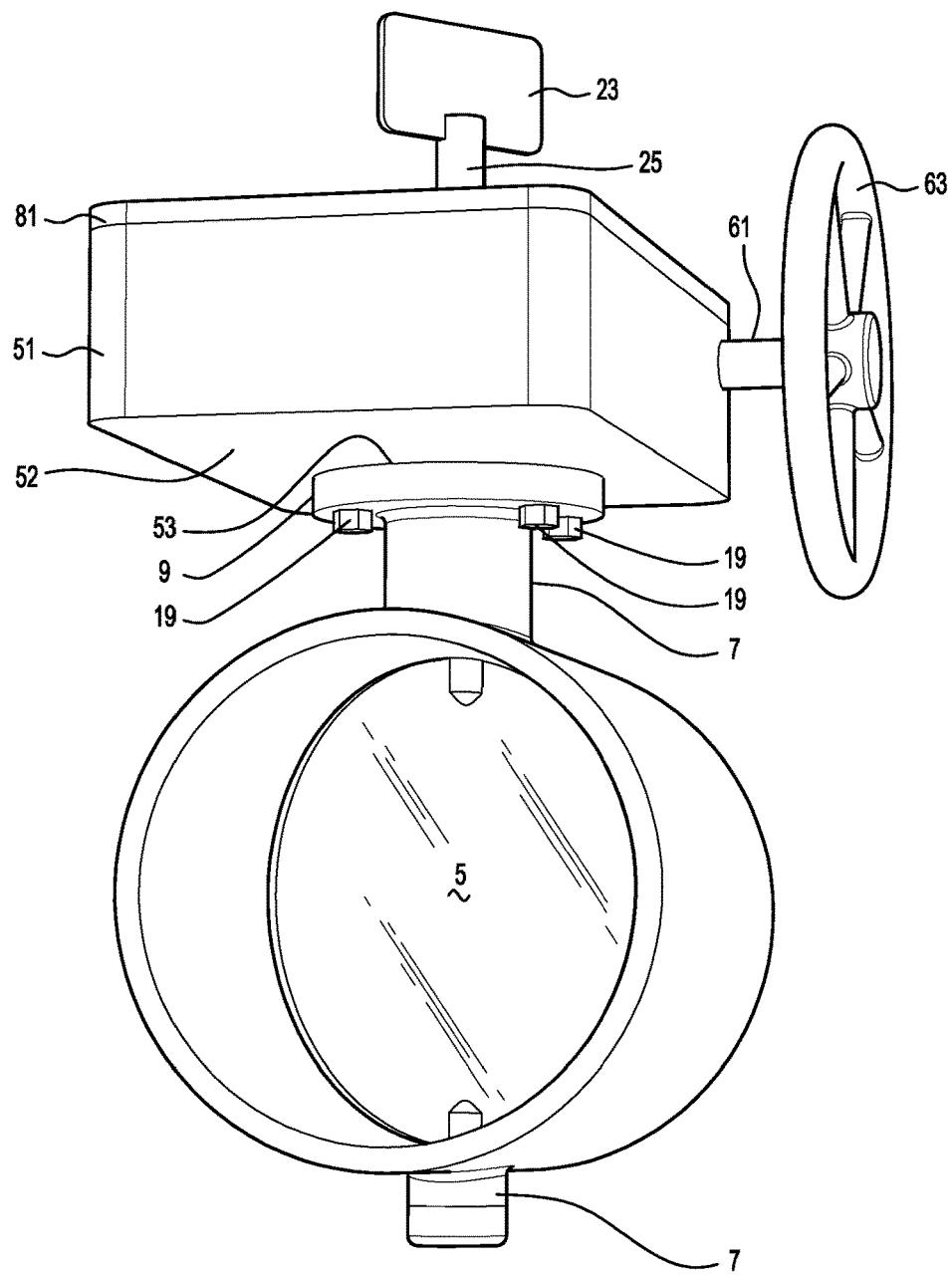
FIG. 6, is an underneath perspective view of the valve shown in FIGS. 4 and 5 with the gate shown in a partly closed condition.
Figure 7:
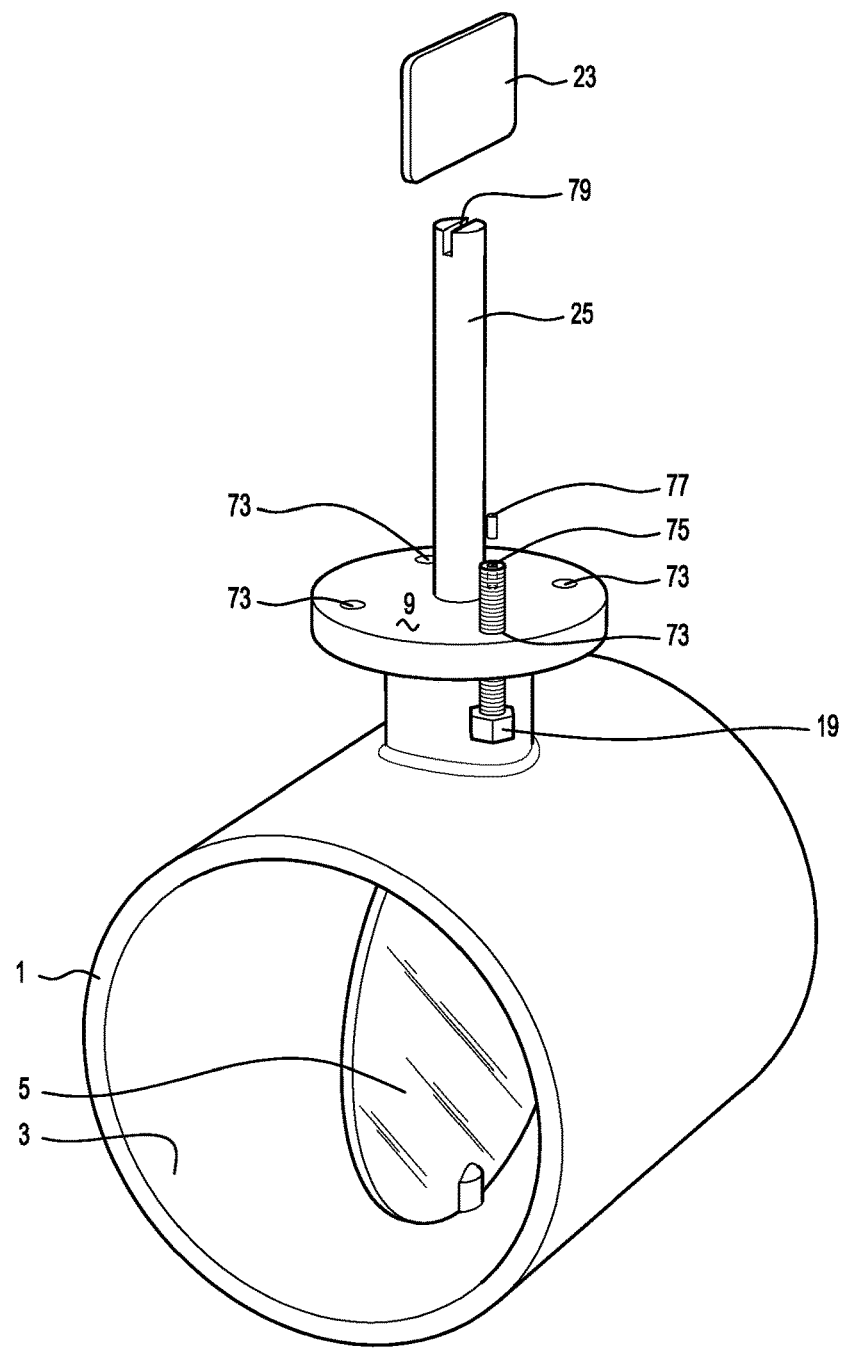
FIG. 7 is a view similar to that in FIG. 6 but with a valve gear box removed.

Referring now to FIG. 7 it can be seen that the prior art valve 1 has the gear box 11 removed thereby exposing the axle 25. FIG. 7 also shows four bolt openings 73 through which the bolts 19 can pass. The openings 73 are provided at positions corresponding to the aforementioned ISO standard. Thus, when the gear box housing shown in the example of FIGS. 4 through 6 is fitted to the valve 1, there can be alignment of corresponding bolt openings in the mounting 53 and thus the gear box 51 can be fitted to known prior art valve 1 or indeed to any future valves 1 that are provided with similar ISO standard openings 73.

The housing of the gear box 51 contains an opening (not shown) to permit the axle 25 to extend into the gear compartment 55.

FIG. 7 also shows that one of the bolts 19 has an axial hole 75 at the free end. A permanent magnet is fitted in the hole 75 and retained therein by suitable adhesive such as an epoxy adhesive. The permanent magnet 77 has been shown displaced from the hole 75 but it should be appreciated that the magnet 77 will be fitted within hole of the free end of the bolt 19, and held therein by the adhesive. The bolt is of a non-ferrous material such as stainless steel in order to minimise the magnetic effect loss that would otherwise occur if the magnet were fitted in a ferrous bolt such as a mild steel bolt.

FIG. 7 also shows a slot 79 in the free end of the axle 25. The slot is aligned with the gate 5 and an indicator 23 can be fitted into the slot 79 and fixed thereto by a screw (not shown) or otherwise such as by a suitable adhesive such as an epoxy. Thus, the plane of the indicator 23 will be aligned with the plane of the gate 5 and can provide a visual indicator for determining the position of the gate 5.

FIG. 6 shows that the axle 25 extends through a lid 81 of the gear box 51.

In the embodiment a valve monitoring sensor (see FIGS. 4 and 5) is operatively positioned with the mounting 53 and the mounting flange 9. In this case, the valve monitoring sensor 83 is a reed switch which is be held in the electrically closed switched state in the presence of the permanent magnet 77 in the bolt 19. That is, the valve monitoring sensor 83 is positioned in the electrical compartment 57 and can co-operate with the permanent magnet 77 in the bolt 19 when the gear box 51 is positioned over the valve 1 by the mounting 53 co-operating with the mounting flange 9. This is diagrammatically shown in FIG. 8. Here, when the bolt 19 containing the permanent magnet 77 is screwed into the aperture in the mounting 53 on the underside of the housing of the gear box 51, the permanent magnet 77 will be brought into proximity to hold the reed of the valve monitoring sensor 83 in the electrically closed switched state. Any removal of the bolts 19 to attempt to remove the gear box, or indeed to rotate the gear box while shutting the gate with the bolts removed, will then trigger an alarm condition on the consequent separation of the assembled relationship of the mounting and the mounting flange. Thus, one problem of the prior art valve monitoring has been solved where any attempt to remove the gear box to maliciously operate the gate 5 can be detected even though gate position sensor is still maintained in a state that indicates the gate 5 is open.

Figure 8:
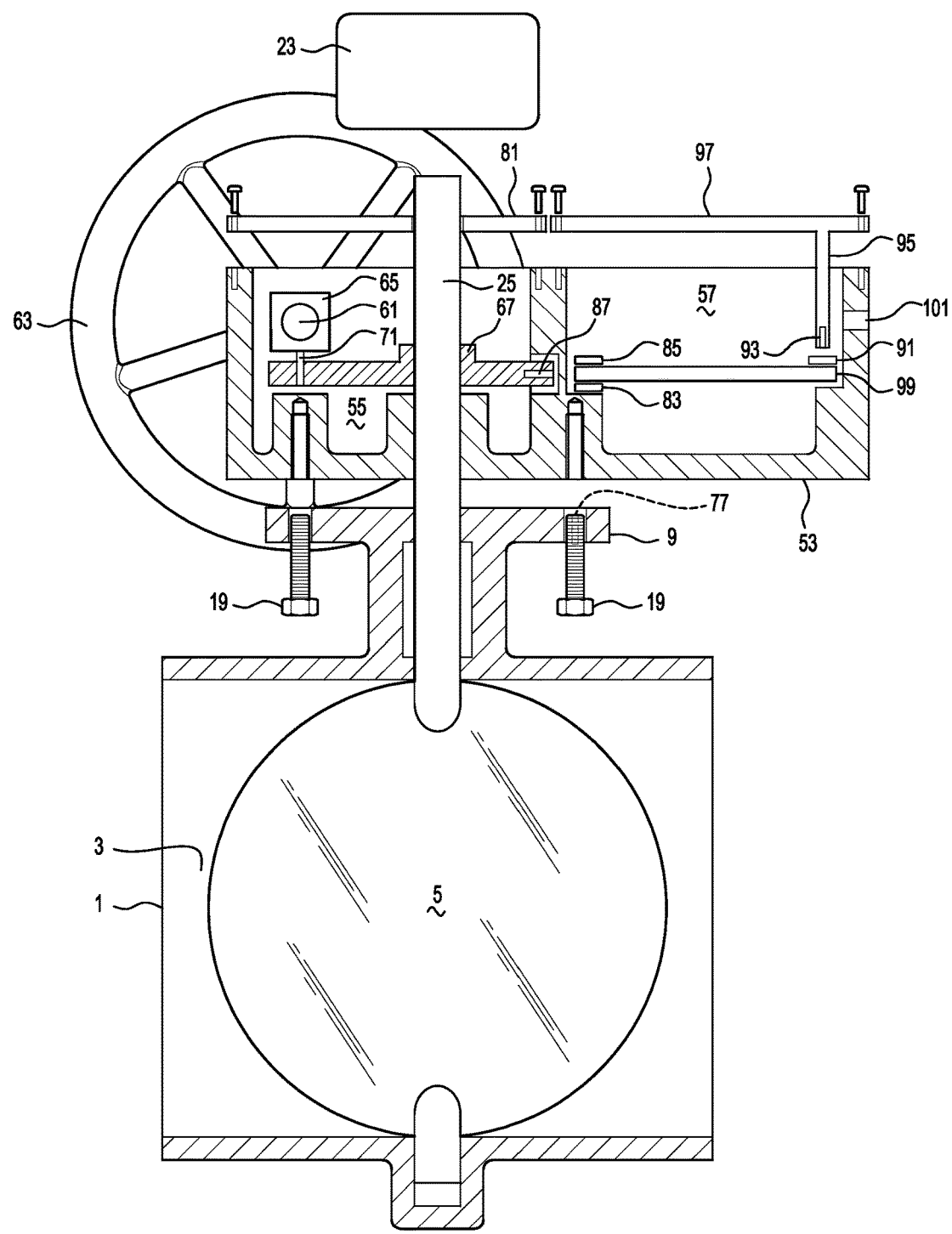
FIG. 8 is a cross-sectional view of the valve and gear box taken along section line 8-8 of FIG. 5.

Referring now specifically to FIGS. 4, 5 and 8, it can be seen that there is provided a gate position sensor 85 associated with the gear driven link within the gear compartment 55. Here, the gate position sensor 85 is a reed switch which is arranged to be under the influence of a permanent magnet 87 that is carried by the arm 67. The permanent magnet 87 is, in this example, fitted at a position that aligns directly above the gate 5. The permanent magnet can be fitted in a suitable hole in the arm 67 and held therein such as by epoxy or similar adhesive. Thus, in the gate position shown in FIG. 5, the permanent magnet 87 is directly in proximity to the gate position sensor 85 and holds the gate position sensor 85 in a switched state. This indicates that the gate 5 is fully opened. In FIG. 4, the arm 67 has been swung to close the valve, and the permanent magnet 87 has been displaced from the gate position sensor 85 to allow the gate position sensor 85 to change state and trigger an alarm condition. It should be noted, that the arm 67 can swing within an arcuate shaped cut-out 89 in the wall 59. This cut-out 89 permits the permanent magnet 87 to be positioned in close proximity to the gate position sensor 85 and to allow the magnetic flux therefrom to pass through the wall 59 to effect proper operation of the gate position sensor 85.

In some embodiments, the valve gear box 51 may be arranged to monitor for when a valve is closed (such as that illustrated in FIGS. 4 and 5). However, in other embodiments, the valve gear box 51 may be arranged to monitor for when a valve is opened or when any suitable change in state occurs. For example, in embodiments where the valve gear box 51 is arranged to monitor for when a valve is opened, the permanent magnet 87 may alternatively be positioned on the arm 67 so that it is near gate position sensor 85 when the valve is closed. It should be noted that any suitable type of sensor may be used, such as a reed switch, a micro switch or a magnetic travel switch.

Referring again particularly to FIGS. 4, 5 and 8, it can be seen that there is provided a lid sensor 91 that co-operates with a permanent magnet 93 (see FIG. 8 only) that is provided on a stem 95. The stem 95 extends from the underside of a lid 97 that covers the electrical compartment 57 when the lid is closed over the electrical compartment 57. The permanent magnet 93 therefore co-operates with the lid sensor 91 and holds the lid sensor 91 in an electrically switched state. If the lid 97 is removed, then the lid sensor can trigger an alarm condition. Thus, if a person were to attempt to remove the lid 97 to electrically short any of the sensors in the electrical compartment 57, then the lid sensor 91 will trigger an alarm condition.

It should be appreciated that if the shear pin 71 should shear, then the gate position sensor 85 will always indicate an alarm condition if the gate 5 is moved from the open condition to a closed position as the permanent magnet 87 is fixed relative to the arm 67, and the arm 67 is, in turn, rigidly fixed relative to the axle 25. Thus, the problems in the prior art with the gate position sensor 37 not being directly associated with the axle 25 and the gate 5 are avoided. Thus, the gate position sensor 85 will still be correctly operationally functional to monitor a closing of the gate 5 by being maintained in the same direct association with the arm 67, even if the shear pin 71 has been sheared.

It should be appreciated that each of the valve monitoring sensor 83, gate position sensor 85, and lid sensor 91 can be arranged in one state for correct operation of the valve, and any one of those sensors can be affected by the removal of the respective permanent magnets to change state and thereby trigger an alarm condition.

It should also be appreciated that if fluid should leak into the gear compartment 55 from the fluid passageway 3 then the electrical compartment 57 will be fluid isolated from the fluid then in the gear compartment 55.

It should also be appreciated that the valve monitoring sensor 83, gate position sensor 85, and lid sensor 91 are provided on a circuit board 99 that is mounted in the electrical compartment 57 so there will be correct alignment of the sensors for operation with their respective permanent magnets. In some embodiments, the circuit board 99 may be supported or mounted in a receptacle or container, which is then retained in the electrical compartment 57. This may be advantageous in that it facilitates removal or replacement of the circuit board 99 without requiring removal of the gearbox 51 from the valve 5.

It should also be appreciated that because the housing of the gear box is formed from a non-ferrous metal or other suitable material such as a rigid industrial strength plastics material that the gear compartment 55 and the electrical compartment 57 can be formed with said mounting 53 as a one piece moulding. In addition the non-ferrous nature of the housing does not effect the weakening of the strength of the magnetism of the permanent magnets, and also allows the flux from the permanent magnet 87 to pass through wall 89 without strength degradation.

Figure 14:
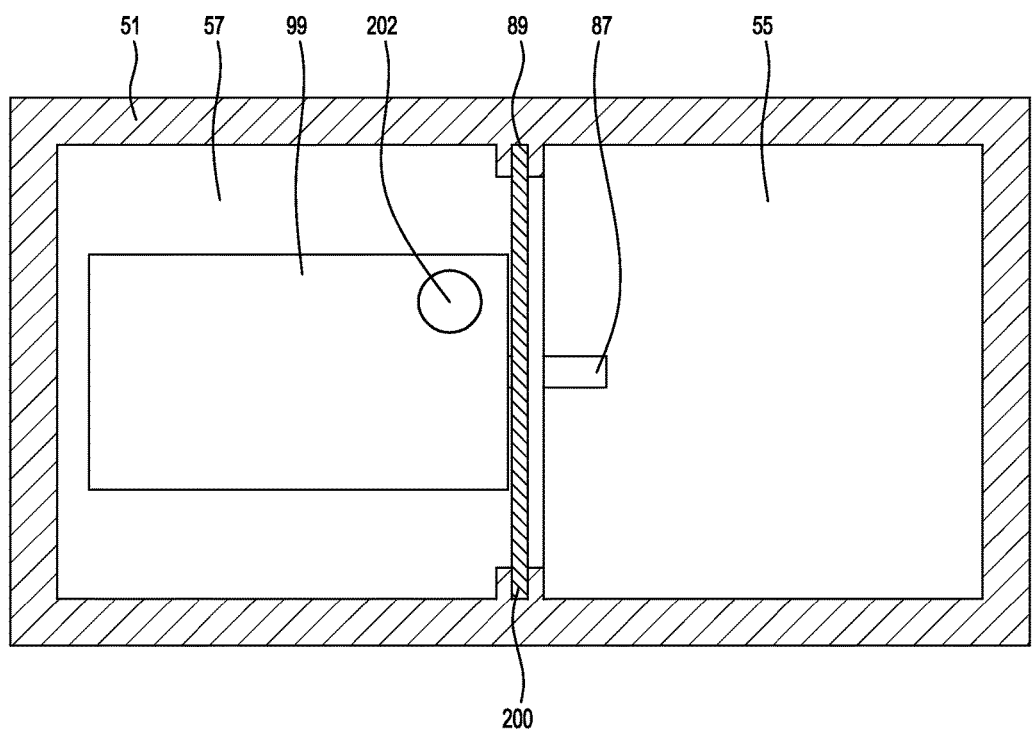
FIG. 14 is a top-down view of an embodiment of the gear box with the lid removed where the gear box housing is made from ferrous material with non-ferrous inserts.
Figure 15:
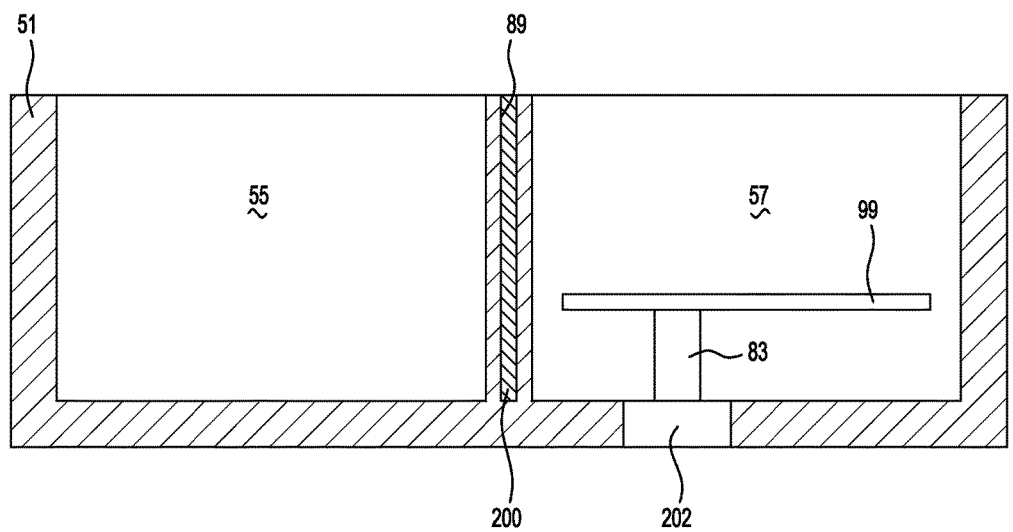
FIG. 15 is a cross-sectional side view of the embodiment of FIG. 14.

However, referring to FIGS. 14 and 15, in other embodiments the gear box 51 may be substantially made from ferrous materials, such as steel. Such embodiments typically provide suitable non-metallic or non-ferrous sections in the gear box 51 housing so that the magnets and reed switches work as intended and so that the housing does not affect the weakening of the strength of the magnetism of the permanent magnets, and also allows the flux from the permanent magnet 87 to pass through wall 89 without strength degradation. In particular, a non-ferrous divider 200 may be provided between the gear compartment 55 and the electrical compartment 57 so that an arm-mounted magnet 87 may interact with a reed switch (such as switch 85 in FIGS. 4 and 5) provided on the PCB 99 with no interference. Similarly, a non-ferrous insert 202 may be provided in the base of the gear box 51 housing (below the PCB 99) so that sensor 83 can interact with a magnet (such as magnet 77 in FIG. 8) provided in a bolt to indicate if the gear box 51 is removed from the valve. However, in other embodiments, the insert 202 may be replaced with, for example, a rubber grommet and sensor 83 may be provided as a micro switch that is arranged to be actuated by a rod that passes through the grommet. Thus, the micro switch could be used for detecting if the gear box 51 is removed from the valve.

It should also be appreciated that there is no electrical termination box associated with the electrical compartment 57, and therefore, any electrical connections and leads that need to pass to the circuit board 99 pass directly through openings 101. The only way to obtain access to the connection of the circuit board 99 is by way of removing the lid 97. Thus, under normal operation conditions, any removal of the lid 97 will trigger an alarm condition.

It should also be appreciated, that the electrical compartment 57 has a sufficiently large volume to accommodate the insertion of addressable interface devices. Addressable interface devices are known to permit the identification of which particular valve may be indicating an alarm condition. The addressable interface devices may be advantageous in that they also secure the integrity of the cabling, for example, through encoded signals provided by hardware or software or both therein.

Figure 9:
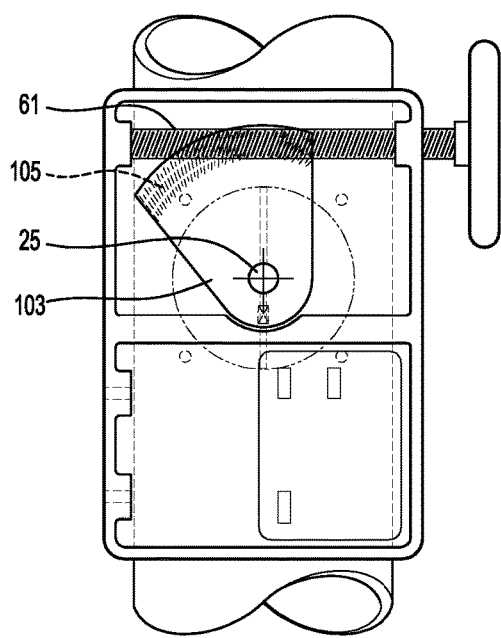
FIG. 9 is a view similar to that of FIG. 4 but showing an example of a further embodiment of valve and gear box with the gate in a fully opened condition.
Figure 10:
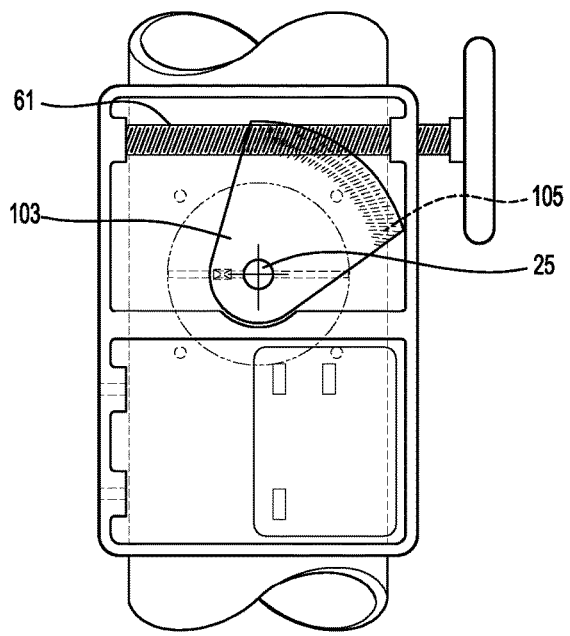
FIG. 10 is a view similar to that of FIG. 9 but showing the gate in a fully closed condition.

FIGS. 9 and 10 illustrate an embodiment of the invention. This embodiment may be of substantially identical construction to the embodiment shown in FIGS. 4 to 8, except that there is provided a quadrant plate 103 that connects directly with the axle 25, instead of there being a connection with an arm 67. Here, the quadrant plate 103 is provided with appropriate teeth 105 to mesh with the worm gear 61. Thus, the nut 65 can be dispensed with. The example shown in FIGS. 9 and 10 is otherwise identical to that shown in the example of FIGS. 4 through 8. A shear pin (not shown) can be fitted between the quadrant plate 103 and the axle 25, to function in the same way as the shear pin 71 in the previous embodiment. The shear pin would be positioned where the axle 25 passes into the quadrant plate.

Figure 11:
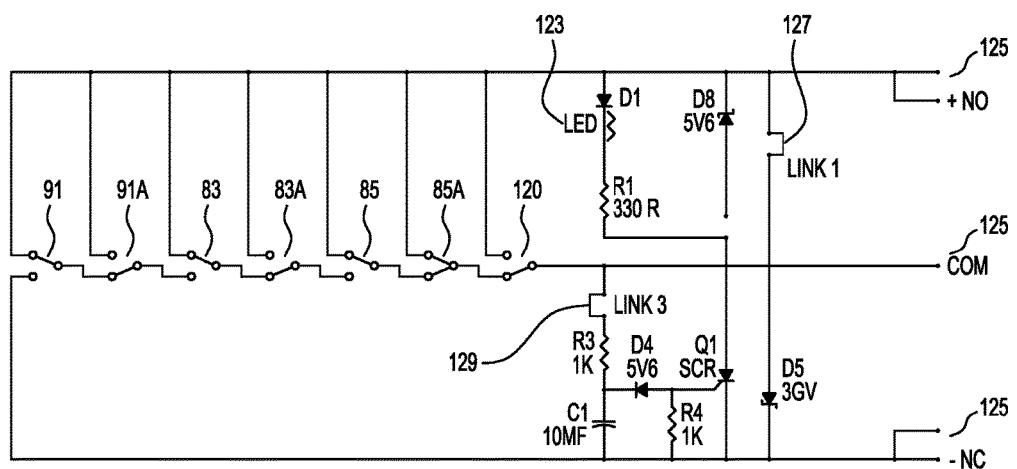
FIG. 11 is an electric circuit diagram of a printed circuit board which contains sensors for use in the examples shown in FIGS. 4 through 10.

Referring now to FIG. 11 there is shown an electrical circuit diagram of a printed circuit board that contains sensors for use within the valve gear box. Here, the sensors previously identified by numerals 83, 85 and 91 have been shown. Each of the sensors is interconnected in a series arrangement with at least one protection sensor 120. The protection sensor 120 is an additional sensor such as a magnetically operable sensor that is positioned within the electrical compartment 57 of the gear box 51. This additional protection sensor 120 is a magnetically operable sensor such as a Reed switch that will change state if an external magnetic field is applied to the gear box. An external magnetic field may be applied to the gear box by a person maliciously wishing to remove the gear box connection with the valve without triggering an alarm condition. Thus, the application of the external magnetic field may be applied in an attempt to "fool" the valve monitoring sensors into not changing state when the gear box 51 is separated from the valve 51. Thus, the additional sensor 120 acts as a protection sensor under such circumstances and will act to trigger an alarm in that event.

It should be noted that each of the sensors 83, 85 and 91 have respective further sensors 83A, 85A and 91A, associated therewith. These are positioned on the circuit board in close proximity to the respective sensors 83, 85, and 91 but not sufficiently close to be under the influence of the magnetic fields from the respective permanent magnets. These additional protection sensors 83A, 85A and 91A, act similarly to the protection sensor 120. The concept of protection sensors is disclosed in the aforementioned U.S. Pat. Nos. 4,696,325, 4,967,792, and 5,031,660, which are incorporated herein by reference.

The circuit also includes a LED 123 which can be brought into an illuminated state if there is a fault condition registered by one of the sensors. The LED may be made visible through a suitable window provided in the electrical compartment 57 or in the lid 97. The circuit has connections 125 to permit electrical connection with control circuitry used for sensing the state of the sensors at a remote location. Circuitry for the remote sensing is known per se. The circuit also contains two links 127 and 129 which can be broken if it is desired to inhibit operation of the LED 123. Under normal operating conditions where the LED 123 is to be made active, the LED is controlled by suitable diodes and transistor control circuits indicated in FIG. 11.

Figure 12:
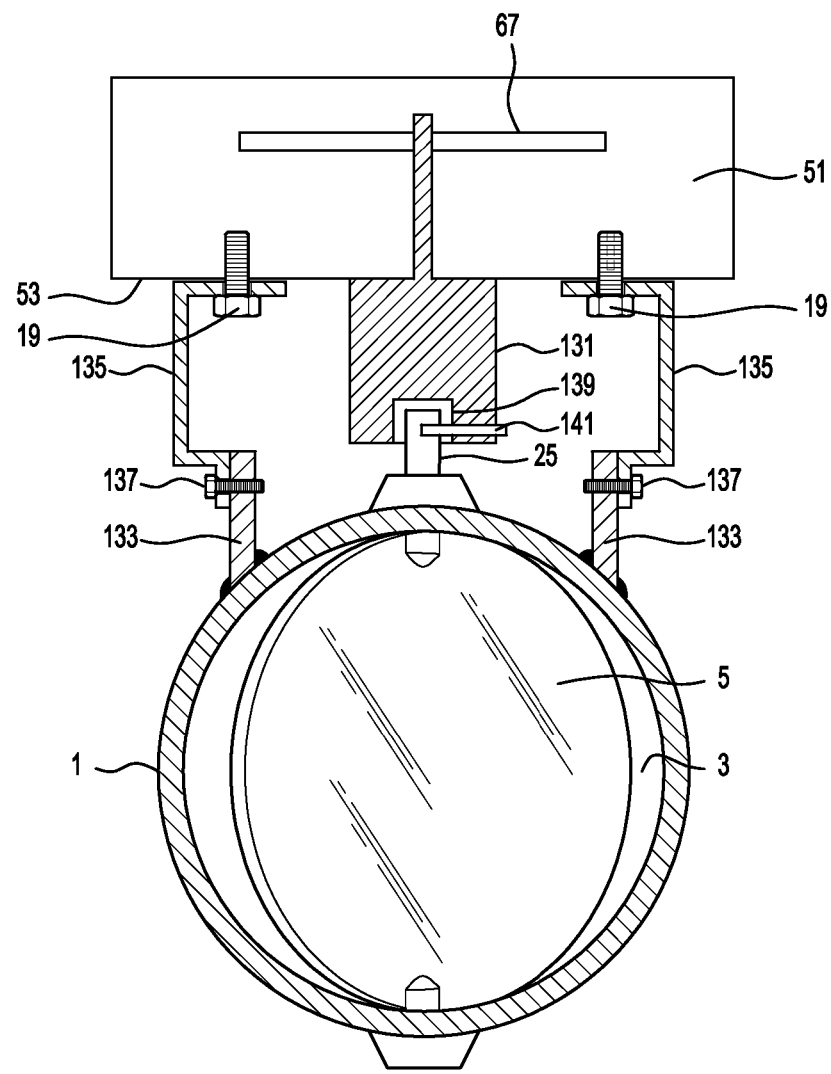
FIG. 12 is a view similar to that of FIG. 8 but showing a different type of valve and the use of an adaptor.

Referring now to FIG. 12 there is shown a view similar to that of FIG. 8 but of a different type of valve and the use of an adaptor 131. Here, the valve has two upstanding flanges 133 which interconnect with mounting brackets 135. The mounting brackets 135 are bolted to the flanges 133 and to the mounting 53 of the gear box 51. In this case, a person could attempt to remove and separate the gear box 51 from the valve 1 by removing the bolts 137 that interconnect the mounting brackets 135 with the flanges 133. In this case, separation could not occur because the adaptor 131 is fixed relative to the arm 67 within the gear box. Thus, removing the bolts 137 will not permit the gear box 51 to be displaced sufficiently from the valve 1 to attempt change the state of the gate 5 of the valve. It can be seen that the adaptor 131 has a recess 139 at its lower end and an axle 25 of the gate 5 is received within the recess 139. A locking pin 141 is then driven through the adaptor 131 sidewall and into the axle 25. Thus, because the arm 67 is locked to the upper end of the adaptor 131 by a shear pin, the gear box 51 is essentially retained relative to the valve 1 unless there is removal of the bolts 19 which would then cause an alarm condition. The adaptor 131 may be appropriately sized for different models of valves of the type shown in FIG. 12.

Figure 13:
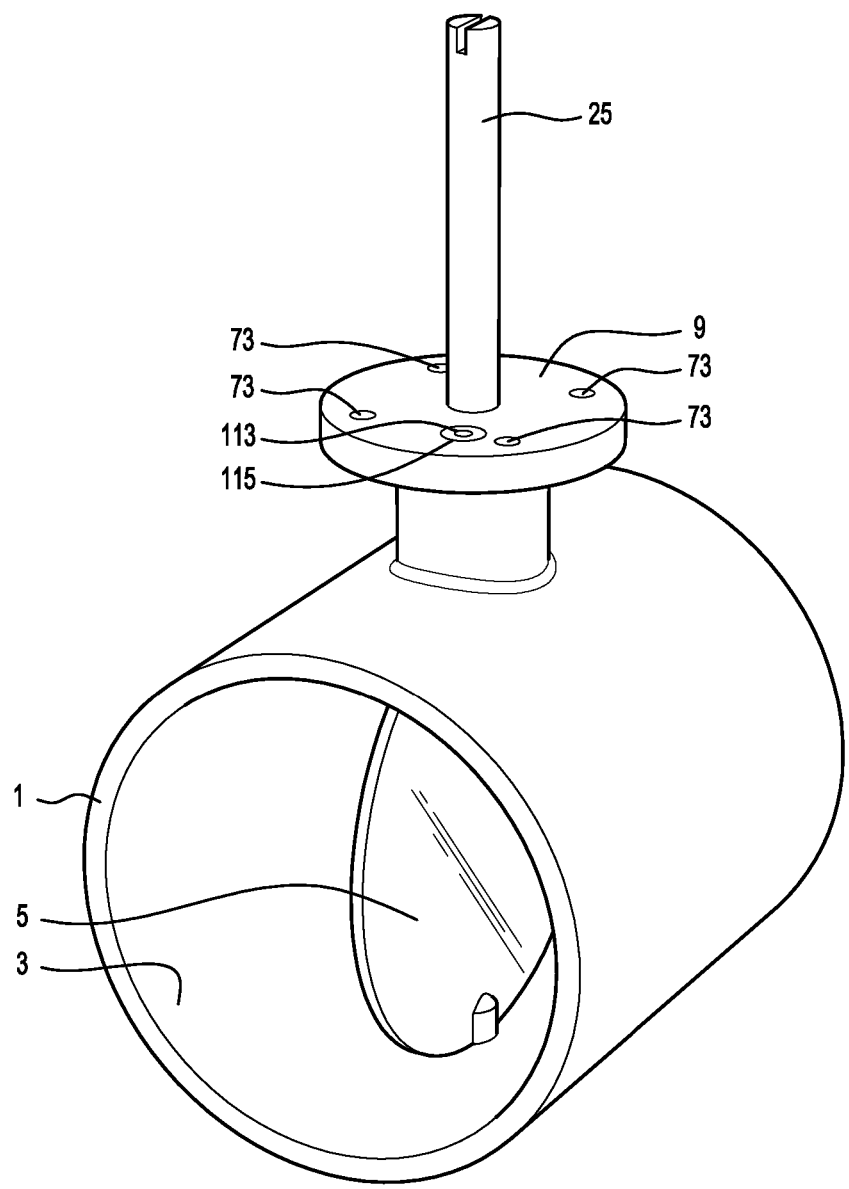
FIG. 13 is a view similar to that of FIG. 7 and showing an example of a further embodiment.

Referring now to FIG. 13 there is shown an alternative valve monitoring sensor arrangement where the permanent magnet 77 that is fitted to the end of the bolt 19 is replaced by a small permanent magnet 113 that is retained in a drilled hole 115 provided in the mounting flange 9. The permanent magnet 113 may be embedded in a shroud 117 of brass or similar material to minimise the weakening of the strength of the permanent magnet 113 by the passage of flux leaking into the metal mounting flange 9.

Figure 16:
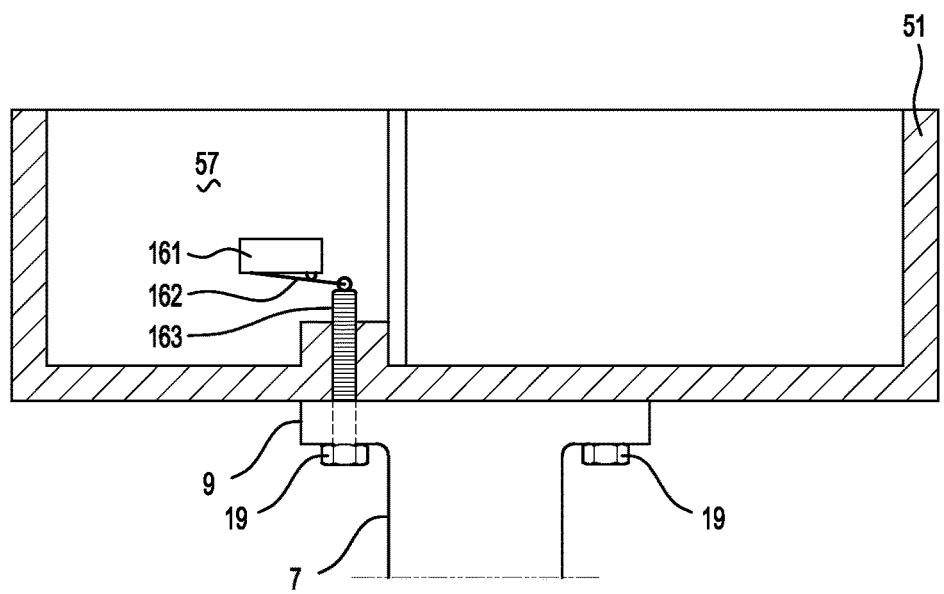
FIG. 16 is a cross-sectional side view of an embodiment where the valve monitoring sensor is a micro switch.

Referring now to FIG. 16, there is shown an embodiment, where the valve monitoring sensor for monitoring separation of the gear box 51 from the valve 1 is a micro switch 161 mounted within electrical compartment 57 so that an arm 162 of the micro switch contacts a tip 163 of one of the bolts 19. If bolt 19 is undone, the arm 162 of micro switch 161 will no longer contact the tip 163 of bolt 19 and an alarm condition will be triggered.

Figure 17:
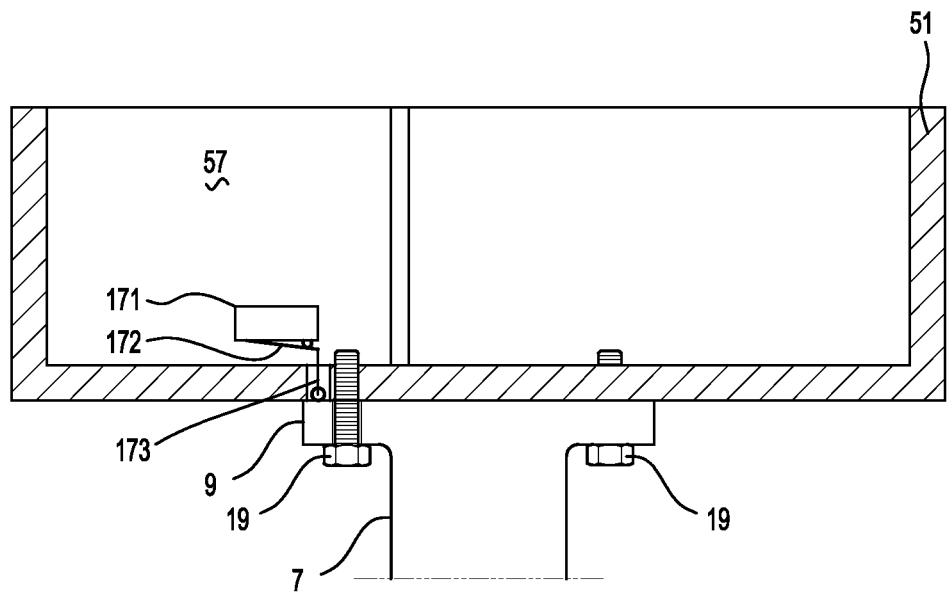
FIG. 17 is a cross-sectional side view of another embodiment where the valve monitoring sensor is a micro switch.

Referring now to FIG. 17 there is shown an embodiment, where the valve monitoring sensor for monitoring separation of the gear box 51 from the valve 1 is a micro switch 171 mounted within electrical compartment 57 so that an arm 172 of the micro switch extends through a hole 173 in the gear box 51 casing to contact the valve mounting flange 9. If the gear box 51 is separated from the valve 1, the arm 172 of micro switch 171 will no longer contact the valve mounting flange 9 and an alarm condition will be triggered.

It should be appreciated that the gear box 51 may be provided as a product for fitting to existing valves, or alternatively the gear box 51 may be provided as an original component fitted to a valve.

It should also be appreciated that the sensors may be in a normally open state, and be operable to change to a closed state, in order to trigger an alarm condition. It should also be appreciated that the sensors may comprise other sensors such as micro switches, proximity sensors or the like. Whilst the examples described above discuss sensing of the valve in the "open" condition, and triggers an alarm if the valve is moved to the closed position, the valve may be set up so that the sensors sense the closed condition of the valve and trigger an alarm if the valve is moved to an open condition. All such modifications are to be deemed within the scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A valve gear box having a valve monitoring function, said valve gear box being for mounting to a valve that has a fluid passageway and a gate therefor, said gear box providing a gear driven link for moving said gate between open and closed conditions of said fluid passageway, said valve gear box being in a housing that has a mounting for permitting operative connection to the valve via a mounting flange of said valve, said mounting and said mounting flange having a valve monitoring sensor operatively positioned therewith, said sensor being settable in one state when said mounting and said mounting flange are in assembled relationship to each other but being configured to change from said one state if there is a separation of the fastened connection of the mounting and said mounting flange, whereby a change in state from said one state can be used to monitor a separation of the assembled relationship of said mounting and said mounting flange and trigger an alarm condition, wherein said gear driven link has a gate position sensor associated therewith so that said gate position sensor can be in one state when the gate is in an opened condition, and which can change from said one state when said gate is moved towards a closed condition, whereby a change of state from said one state can be used to monitor a closing of said gate and trigger an alarm condition.

2. A valve gearbox as claimed in claim 1, wherein part of said gate position sensor is mounted to an arm that is directly drive connected with a spindle of said gate.

3. A valve gearbox as claimed in claim 2, wherein said gear driven link includes a shear separator that will shear in the event of excess force being applied to an operator handle, and wherein said gate position sensor will still be correctly operationally functional to monitor a closing of said gate even if said shear separator has been separated.

4. A valve gearbox as claimed in claim 3, wherein said operator handle drives a worm gear which, in turn, drives a travelling nut that can advance or retreat along the worm gear corresponding to a direction of rotation of said operator handle, and wherein said travelling nut has a shear separator connection with said arm.

5. A valve gearbox claimed in claim 1, wherein said mounting is of a non-ferrous material.

6. A valve gearbox as claimed in claim 1, including at least one magnetically operable protection sensor that changes state upon an external magnetic field being applied to the gear box.

7. An apparatus comprising a valve gearbox as claimed in claim 1 fitted to a valve.

8. A valve gear box having a valve monitoring function, said valve gear box being for mounting to a valve that has a fluid passageway and a gate therefor, said gear box providing a gear driven link for moving said gate between open and closed conditions of said fluid passageway, said valve gear box being in a housing that has a mounting for permitting operative connection to the valve via a mounting flange of said valve said mounting and said mounting flange having a valve monitoring sensor operatively positioned therewith, said sensor being settable in one state when said mounting and said mounting flange are in assembled relationship to each other but being configured to change from said one state if there is a separation of the fastened connection of the mounting and said mounting flange, whereby a change in state from said one state can be used to monitor a separation of the assembled relationship of said mounting and said mounting flange and trigger an alarm condition, wherein said gear driven link is provided in a gear compartment of a housing associated with said mounting, and wherein said valve monitoring sensor comprises an electrical switch which can change state if there is separation of said mounting and said mounting flange, and wherein the electrical components of said valve monitoring sensor are in an electrical compartment of said housing separate to said gear compartment.

9. A valve gearbox as claimed in claim 8, wherein said gear driven link has a gate position sensor associated therewith so that said gate position sensor can be in one state when the gate is in an opened condition, and which can change from said one state when said gate is moved towards a closed condition, whereby a change of state from said one state can be used to monitor a closing of said gate and trigger an alarm condition and wherein electrical components of said gate position sensor are in said electrical compartment.

10. A valve gearbox as claimed in claim 9, wherein said electrical compartment is closed by a removable lid and wherein a lid sensor is associated therewith, and wherein said lid sensor can be in one state when said lid is closed and which can change from said one state when said lid is opened, whereby a change of state can be used to trigger an alarm condition.

11. A valve gearbox as claimed in claim 10, wherein external electrical termination with said valve monitoring sensor is via terminals within said electrical compartment and without said valve having an external electrical junction box, whereby to inhibit tampering with the electrical terminations without removal of said lid.

12. A valve gearbox as claimed in claim 10, wherein said lid sensor comprises an electrical switch which can change state during an opening of said lid, and wherein electrical components of said lid sensor are in said electrical compartment.

13. A valve gearbox as claimed in claim 12, wherein said valve monitoring sensor, said gate position sensor and said lid sensor, are reed switches that co-operate with respective permanent magnets, there being a valve monitoring sensor permanent magnet carried by said mounting flange, a gate position sensor permanent magnet carried by said arm, and a lid position sensor permanent magnet carried by said lid.

14. A valve gearbox as claimed in claim 13, wherein said valve monitoring sensor, said gate position sensor, and said lid sensor are mounted on a circuit board that is, in turn, mounted in said electrical compartment so there will be correct alignment of the sensors for operation with their respective permanent magnets.

15. A valve gearbox as claimed in claim 12, wherein said valve monitoring sensor, said gate position sensor and said lid sensor are reed switches that co-operate with respective permanent magnets, there being a valve monitoring sensor permanent magnet carried in a bolt used for bolting said mounting to said mounting flange, a gate position sensor permanent magnet carried by said arm, and a lid position sensor permanent magnet carried by said lid.

16. A valve gearbox as claimed in claim 8, wherein said gear compartment and said electrical compartment are fluid isolated from each other whereby if fluid should leak into said gear compartment from said fluid passageway, said electrical compartment will be fluid isolated from the fluid then in said gear compartment.

17. An apparatus comprising a valve gearbox as claimed in claim 8 fitted to a valve.

\* \* \* \* \*